Sept. 24, 1946.　　　　L. A. DE ROSA　　　　2,408,049
INTELLIGENCE TRANSMISSION SYSTEM
Filed June 18, 1943　　　　3 Sheets-Sheet 2

INVENTOR.
LOUIS A. DE ROSA
BY
ATTORNEY

Sept. 24, 1946.　　　　L. A. DE ROSA　　　　2,408,049
INTELLIGENCE TRANSMISSION SYSTEM
Filed June 18, 1943　　　3 Sheets-Sheet 3

INVENTOR.
LOUIS A. DEROSA
BY
ATTORNEY

Patented Sept. 24, 1946

2,408,049

UNITED STATES PATENT OFFICE 2,408,049

INTELLIGENCE TRANSMISSION SYSTEM

Louis A. de Rosa, West Brighton, Staten Island, N. Y., assignor to Federal Telephone and Radio Corporation, Newark, N. J., a corporation of Delaware Application June 18, 1943, Serial No. 491,288

16 Claims. (Cl. 178—30)

This invention relates to improvements in intelligence transmission systems, and more particularly to systems in which intelligence is transmitted in the form of pulses, and received and converted into visual intelligence.

Systems have been heretofore proposed in which intelligence in the form of pulses or a series of pulses is transmitted directly or by carrier wave to a receiver where such pulses are converted into visual intelligence either by means of controlling the pattern on the screen of a cathode ray tube or by impressions upon a moving tape. In some systems the character to be transmitted is divided up into several transverse bands such as five or seven, of several groups of pulses each, the number and position of pulses in each band determining the formation of the transmitted character. The pulses may be sent at a common frequency, or, it is sometimes advantageous to transmit each band of pulses at different frequencies.

In all such systems the time interval between pulses or sets of pulses is determinative of the character to be reproduced at the receiver, and various means have been proposed to produce sets of such timed pulses in accordance with the characteristics of the intelligence to be transmitted, such as a letter or numeral. In prior systems it has been usual to pre-form mechanical patterns which, through the use of light-responsive tubes or similar means form series of pulses corresponding to the letter to be transmitted, the pattern chosen being controlled by a keyboard or similar means. Such systems and such means are described, for example, in the copending applications of Edmond M. Deloraine, S. N. 415,554, filed October 18, 1941, and Edmond M. Deloraine, et al., S. N. 469,056, filed December 15, 1942.

It is one of the objects of the present invention to eliminate the use of mechanical devices previously necessary in producing the timed pulses used as a basis for the formation of character-identifying signals.

Another object of my invention is directed toward the use of an electronic counter circuit in connection with what may be termed an electrical pattern for deriving sequentially timed pulses in an intelligence transmission system.

A further object of this invention is to provide an electronic counter circuit for deriving sequentially timed pulses in an intelligence transmission system, together with controllable means for starting and stopping said counter circuit.

More specifically, this invention contemplates the derivation of sequentially timed pulses from a master electronic counter circuit, divided into a number of sub-counter circuits corresponding to the number of bands used in forming a character, each of said sub-counter circuits, in turn, comprising a number of gaseous discharge tubes corresponding to the maximum number of pulse-forming sections of each band, together with controllable means for applying chosen pulses from each band to a transmitting and character-reproducing system.

These and other features of the invention will be best understood and appreciated from the following description of a preferred embodiment thereof, described for purposes of illustration and shown in the accompanying drawings in which:

Fig. 5 is a block circuit diagram of a receiving system adapted to be used with the transmitting system illustrated in Figs. 1, 2 and 3.

Figure 1:
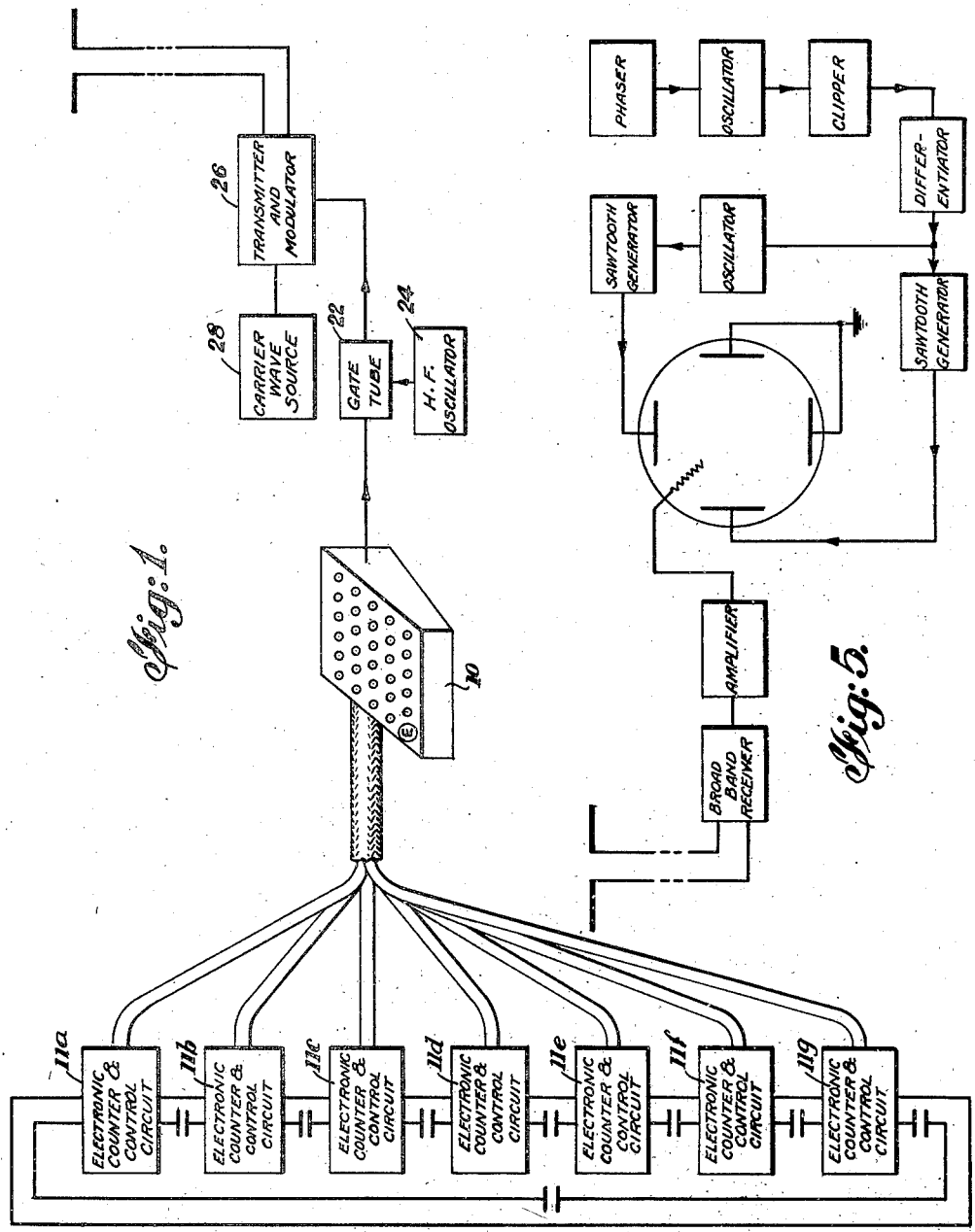
Fig. 1 is a block circuit diagram of the preferred form of pulse generation, selection and transmitting system according to the present invention.

Generally speaking, the preferred arrangement for producing character-forming pulses according to the present invention, and illustrated in Fig. 1, will consist of a switch operating keyboard 10 provided with a plurality of keys having indicia thereon corresponding to the character to be produced. The switch mechanism of the keyboard 10 is supplied with pulses from a master electronic counter control circuit consisting of a plurality of sub-electronic counter and control circuits 11a, 11b, 11c, 11d, 11e, 11f and 11g, the number of these sub-counter circuits depending upon the number of transverse bands into which the characters to be reproduced are divided. The various sub-counter and control circuits 11a to 11g inclusive are serially connected with one another with means being provided for re-actuation of the circuit 11a by the last circuit 11g to form a continuously rotating master counter circuit. The outputs of the various counter circuits as controlled by the switches of keyboard 10 are applied to the control circuit of a gate tube 22 supplied from a suitable high frequency oscillator 24. The output of the gate tube is connected to a transmitter and modulator 26 which may be supplied by a carrier wave source 28. While the invention is particularly adapted for use in the radio transmission of signals, it will be clear to those skilled in this art that a direct wire transmission with or without a carrier can be utilized, if desired.

Figure 2:
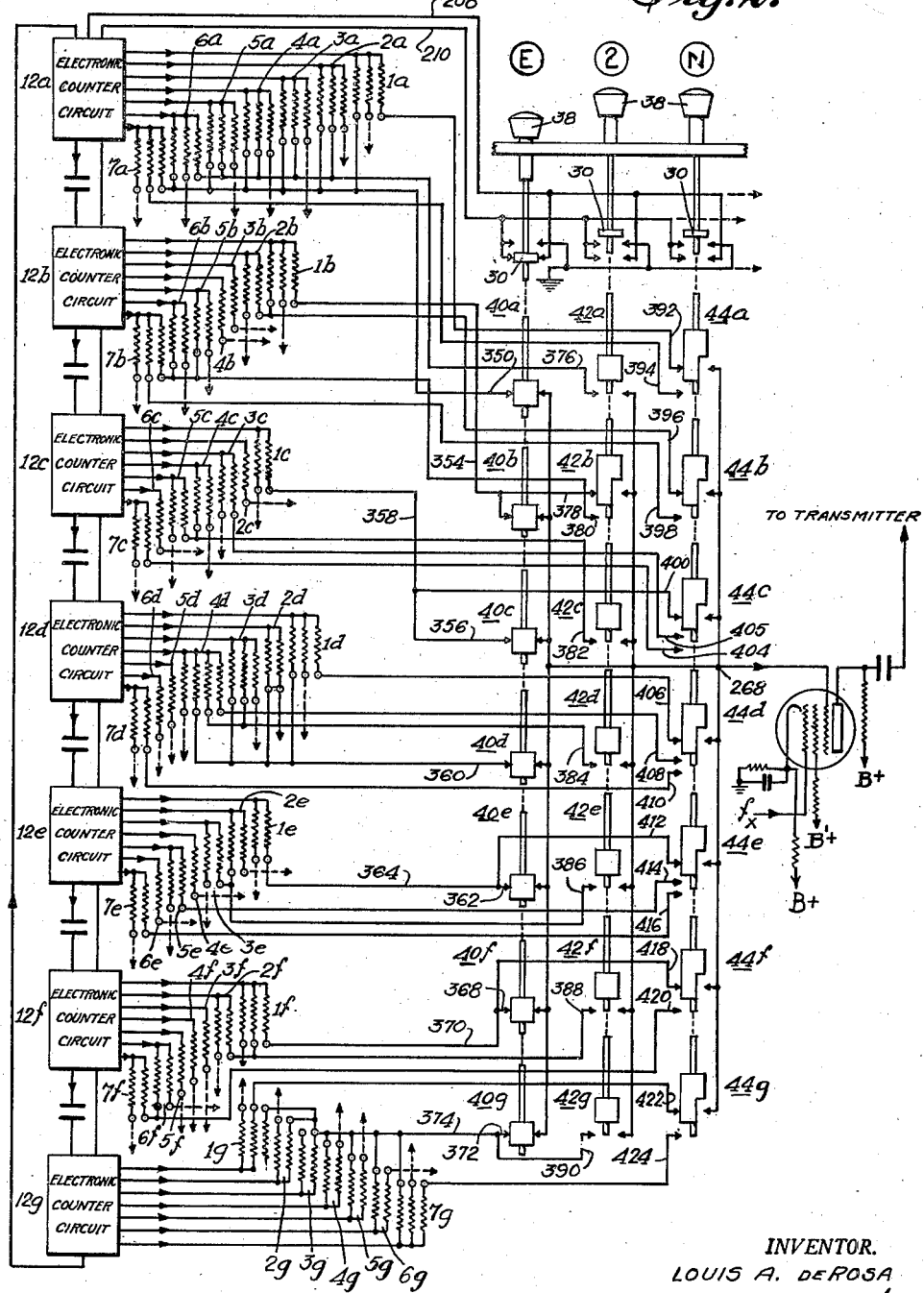
Fig. 2 is a more detailed circuit diagram, partially in block form, of the pulse deriving and controlling system shown in Fig. 1.
Figures 3, 4:
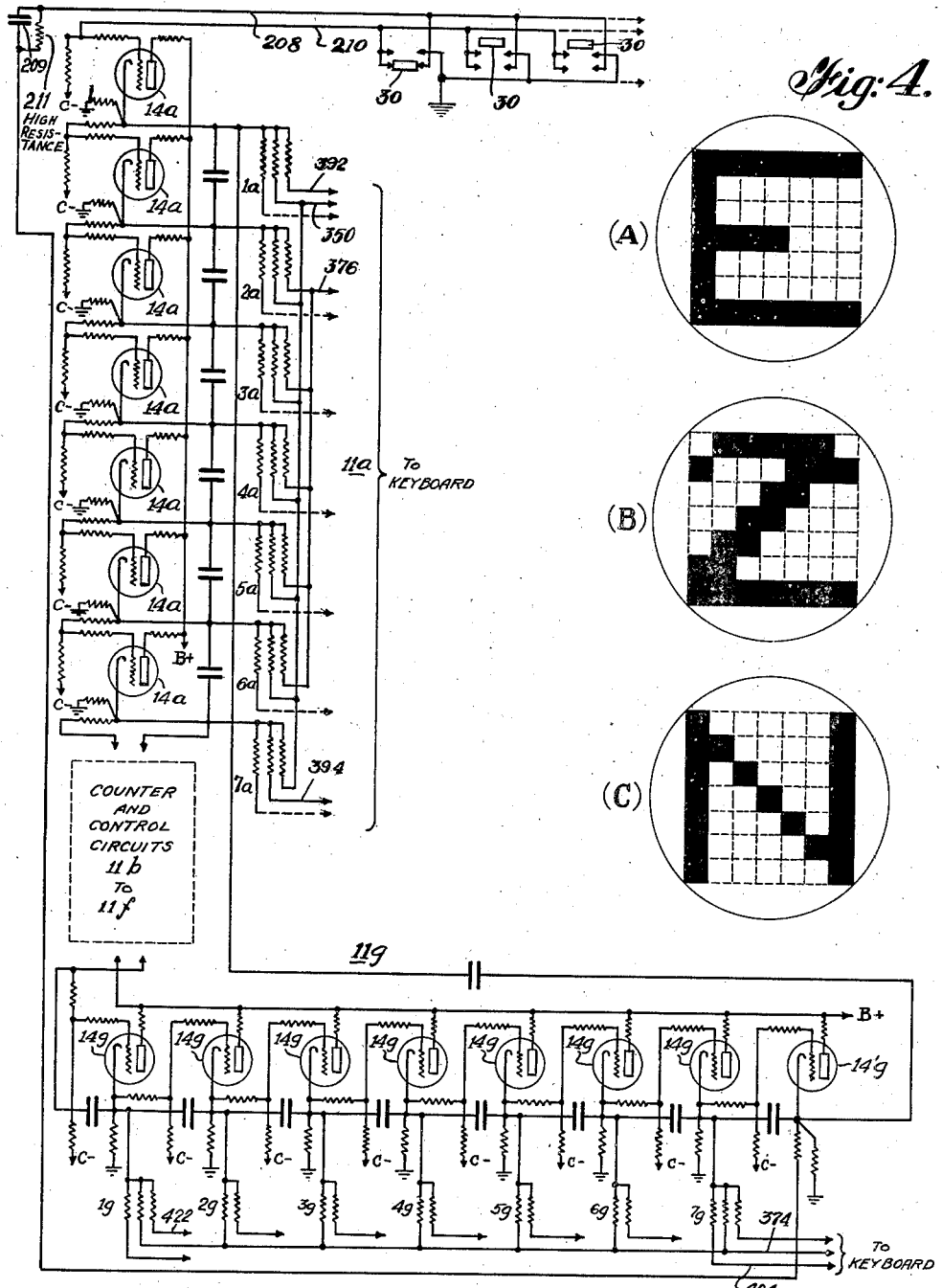
Fig. 3 is a circuit diagram illustrating further details of some of the electronic counter circuits shown in Figs. 1 and 2.
Fig. 4 shows examples of intelligence in the form of letters and numerals of the type produced by the system illustrated in Figs. 1, 2 and 3.

As will be seen in Figs. 2 and 3, each of the electronic counter and control circuits consists of an electronic counter circuit from which are derived output leads which are controlled by the keyboard switches, such control being varied in dependence upon the individual switch operated. Since the outputs from any one counter circuit may be applied to a large number of switches, each output lead is separated through suitable isolating resistors into a plurality of output conductors connected to individual switches. For example, the electronic counter and control circuit 11a will consist of an electronic counter circuit 12a from the individual tubes of which are derived output leads which, in turn, are each further divided by resistor banks such as 1a, 2a, 3a, 4a, 5a, 6a and 7a. Similarly, the electronic counter circuit 12b has associated therewith resistor banks 1b to 7b inclusive, counter circuit 12c with resistor banks 1c to 7c inclusive, etc. The various electronic counter circuits illustrated by way of example are similar in arrangement and operation to the "Electronic switching system" described in U. S. patent to Shumard 2,146,862, issued February 14, 1939, although other equivalent electronic counter circuits could be used.

As previously noted, the electronic counter circuits are serially connected with one another with a connection from the last counter circuit leading back to the first so that when the master counter circuit is once energized it will continue to operate each counter circuit as best seen from Fig. 3, and will preferably consist of a plurality of gaseous discharge tubes so interconnected with one another in a manner known to the art that when a fired tube is energized it will cause energization of the next succeeding tube which, in turn, will extinguish the prior tube of the series. A pulse may be derived from the cathode of each tube in each electronic counter circuit. The individual electronic counter circuits themselves are serially interconnected with one another as by coupling condensers so that the first tube of each counter circuit will, after a predetermined short interval be energized by the last tube of the prior counter circuit and will, in turn, then extinguish that tube. In accordance with the present invention there are a number of individual electronic counter circuits corresponding to the number of bands into which a character is to be divided, while each electronic counter circuit itself contains a number of serially connected, sequentially energized gaseous discharge tubes corresponding to the number of divisions in each band. In accordance with the form of invention shown for purposes of illustration, the characters will be divided into seven bands consisting of seven sections each, as will be more readily apparent from a study of Fig. 4 showing examples of typical characters to be transmitted and reproduced. For example, it will be seen that the letter "E" is formed of seven bands. The first band may be formed by a series of sequential pulses extending throughout the entire band. In the second and third bands, however, the letter is formed by pulses in the first periods only; in the fourth band by sequential pulses for the first four periods; in the fifth and sixth bands by the single pulse occurring in the first period only; and for the seventh band sequential pulses occurring throughout the entire period. In order to energize the transmitting means by sequential pulses to spaced and timed as to form a connection such as the letter "E," it will be necessary to form the proper connections between the individual electronic counter and control circuits with the actuating circuit of the gate tube. The manner in which this is accomplished can best be understood, for example, by a study of Figs. 2 and 3. For example, if one of the keys 38 corresponding to the letter "E" is depressed, switches 40a, 40b, 40c, 40d, 40e and 40f will be closed to respectively interconnect output leads from the electronic counter circuits 12a to 12g inclusive to the actuating circuit of the gate tube 22. As also previously pointed out with respect to the letter "E" a series of sequential pulses are necessary throughout the entire period of the first character-forming band or, in other words, the first electronic counter circuit must supply a continuous sequence of timed pulses for this period. Therefore, the output leads from each of the gaseous discharge tubes 14a of the counter circuit 12a are connected together to a common lead 350 through a resistor of each resistor bank 1a to 7a inclusive. Closure of the switch 40a interconnects this common lead 350 with the control supressor grid of the gate tube 22 through the common control lead 268. To form the next band of the letter "E," it is only necessary to apply a single pulse during the first portion of this second band. Accordingly, the switch 40b closes a circuit from the first gaseous discharge tube of the electronic counter circuit 12b through a resistor of resistor bank 1b, conductors 354 and 352 and thence to the conductor 268 leading to the gate tube. Likewise, for band three, only the output from the first gaseous discharge tube of electronic counter circuit 12c is utilized and closure of the switch 40c will establish a circuit from this tube through a resistor of resistor bank 1c, conductors 358 and 356 and thence through the switch to normal conductor 268. For the fourth band, the output of the first four tubes of electronic counter circuit 12d is utilized. Thus, the output leads from the first four tubes of this electronic counter circuit are connected through individual resistors of banks 1d, 2d, 3d and 4d to common conductor 360 and thence through the switch 40d to the common gate tube lead 218. For the fifth band, again it is only necessary to derive a pulse from the first tube of electronic counter circuit 12e and closure of the switch 40e will establish the necessary connections. The circuit may be traced through a resistor of resistor bank 1e, conductors 364 and 362, the switch 40e and the common gate tube conductor 268. Likewise, for the sixth band, closure of switch 40f establishes a circuit from a resistor of resistor bank 1f and thence through conductors 370 and 368 to the common conductor 268. For the seventh band, it is necessary to derive a continuous sequence of pulses from all of the gaseous discharge tubes of electronic counter circuit 12g. Accordingly, the outputs of all of these tubes are connected together through individual resistors of banks 1g to 7g inclusive to common conductor 374 and thence through conductor 372 and the switch 40g to the common gate tube conductor 268.

In the formation of certain characters it may be necessary to utilize different and separated pulses of each electronic counter circuit. This will become apparent, for example, if an attempt is made to trace the required control circuits to form the numeral "2," shown in Fig. 4 (B). For example, if the switch 38 corresponding to this numeral is depressed, pulses are derived from the electronic counter circuit 12a and applied to the gate tube 22 for the second to the sixth periods inclusive. Thus it is necessary to connect the outputs of the second to the sixth gaseous discharge tubes of electronic counter circuit 12a together, but in order to prevent confusion with other control circuits, these are again brought through isolating resistors in resistor banks 2a to 6a inclusive. The common lead 376 from the resistors in these banks will be connected upon closure of switch 42a to the common conductor 268 for controlling the gate tube 22. In the case of the second band forming numeral "2," it will be noted that a single pulse is required for the first period of this band, then there is hiatus, and then a series of three sequential pulses during the fifth, sixth and seventh bands. The switch 42b, therefore, closes two contacts between the electronic counter circuits 12b and the control lead 268 for the gate tube. The first contact 378 may be connected to the lead 354 which also is connected to the switch 40b for forming the letter "E" since the two characters have this portion of the second band in common. The second connection, however, may be traced from conductor 380 to individual resistors of resistor banks 5b, 6b and 7b which are fed from the last three gaseous discharge tubes of the electronic counter circuit 12b. Switches 42c, 42d, 42e, and 42f will control the application of electronic counter circuits 12c, 12d, 12e, and 12f to the control of the gate tube 22 in a similar manner as previously described above. For example, the lead 382 to switch 42c is connected to resistors in resistor banks 4c and 5c of the counter circuit 12c to provide two sequential pulses during the third bank. Conductor 384 for switch 42d is connected to individual resistors of resistor banks 3d and 4d of counter circuit 12d, conductor 386 for switch 42f is connected to individual resistors of resistor banks 2e and 3e of counter circuit 12e, and conductor 388 to switch 42f is connected to individual resistors of resistor banks 1f and 2f for the first two tubes of counter circuit 12f. Since the last band for the numeral "2" is the same as the last band for the letter "E" previously described, the switch 42g may be connected to the conductor 372 of switch 40g through lead 390. Other letters and characters can be built up from sequentially timed pulses in the manner described in connection with the letter "E" and the numeral "2." In some of the more complicated letters, however, it may be necessary to start and stop the application of pulses to the gate tube as much as three times in a single band. This is true for the letter "N" shown in Fig. 4 (C), particularly for the third, fourth and fifth bands thereof. This only necessitates further control switches or further control contacts on individual switches. For example, it will be noted that in the form of invention shown, the switches 44a to 44g inclusive all have at least two contacts for connection with the common gate tube conductor 268, the switches 44c, 44d and 44e having three contacts apiece. If desired, the specific circuits for the formation of a letter "N" may be traced through conductors 392 and 394 and resistor banks 1a and 7a for the counter circuit 12a and the switch 44a; conductors 396 and 398 and resistor banks 1b, 2b and 7b for counter circuit 12b and switch 44b; conductors 400, 405, 404 and 358 and resistor banks 1c, 3c and 7c for counter circuit 12c, and switch 44c; conductors 406, 408 and 410 and resistor banks 1d, 4d and 7d for counter circuit 12d and switch 44d; conductors 364, 412, 414 and 416 and resistor banks 1e, 5e and 7e for counter circuit 12e and switch 44e; conductors 370, 418 and 420 and resistor banks 1f, 6f and 7f for counter circuit 12f and switch 44f; and conductors 422 and 424 and resistor banks 1g to 7g for counter circuit 12g and switch 44g.

While a character can be formed by a single sequence of pulses beginning with the first tube of the first counter circuit 12a and ending with the last tube of the counter circuit 12g, it is preferable that each letter be traced several times for the sake of clarity, and for this reason it was previously mentioned that the counter circuit 12a is re-started after the last counter circuit 12g to form a continuously rotating master counter circuit. However, means must be provided for starting the first tube of the first counter circuit 12a and, eventually, means must also be provided for stopping rotation of the master counter circuit after a predetermined number of desired traces have been made for each letter. For this reason, each of the character-identifying keys 38 operates another switch 30 which controls starting and stopping means for the master counter circuit. It will be understood from a study of Figs. 2 and 3 that when the keys are raised, the switch 30 does not complete any control circuit. One-direction-operating switches are already known. However, as a key is depressed it first wipes a pair of contacts to momentarily close one circuit, while in the final depressed position of the key, the switch completes a second circuit. From the following it will be obvious that this wiping action of the contacts must be brief enough so that the ground connection is not present when tube 14a is restored after the following tube has operated. Accordingly, as the key is depressed and the switch momentarily closes the first circuit, the grid of the first tube 14a of the electronic counter circuit 12a is momentarily connected to ground through conductor 210, thus reducing the negative grid bias on this tube to render the same conductive. When this tube becomes conductive the remaining tubes of this counter circuit and thence the tubes of the following counter circuits will become sequentially conductive. In the final depressed position of each key, however, the switch 30 will close a circuit from the grid of the first tube 14a of the electronic counter circuit 12a to the cathode of an additional tube 14'g of the counter circuit 12g through a conductor 208 and a condenser 209. When a tube of the counting chain such as tube 14a fires, its cathode potential jumps from a slightly negative value (due to the C battery bias) to a highly positive value (due to the fact that the cathode is in the series path between ground and B battery). This jump in potential is transmitted to the preceding tube cathode, by means of the commutating condenser, to raise that cathode to a potential above that of the B battery and thereby extinguish the tube. The jump in cathode potential is transmitted to the grid of the succeeding tube (via a resistive network) and to the cathode of the succeeding tube (via another commutating condenser) to raise both grid and cathode in potential positively. The succeeding tube therefore does not fire at this time, but as the charge on the commutating condenser leaks off the cathode of the succeeding tube becomes more negative. The grid of the succeeding tube, however, continues to remain at the same positive potential, so that eventually the succeeding tube breaks down, extinguishing the present tube. In the case of tube 14a, the grid is raised to this positive potential by a surge flowing through the isolating condenser 209. This condenser, after starting initially discharged (because of resistor 211) gradually acquires a biasing charge so that eventually the firing of the preceding tube 14'g will not raise the grid of 14a to a sufficiently high value to fire tube 14a. The counting then ceases with tube 14'g ignited. Tube 14'g is later extinguished when tube 14a fires upon the grid of tube 14a being grounded by the operation of a key 30. So far as concerns tube 14'g, it is known that such tubes may be self-extinguishing if the external resistance in the cathode-anode circuit be adjusted sufficiently high for that purpose. It is customary however, to provide a resistance-to-ground connection for the cathodes as is shown on the drawings in which case tube 14'g would become conductive in regular course and remain so till operation of the next key whereupon tube 14a at the beginning of a new cycle extinguishes tube 14'g. In this connection it is observed that tube 14'g is a special tube with no connections for key switch control. The number of revolutions of the master counter circuit which can occur before this condition is established will depend upon the value of the condenser 209 and, in accordance with the present invention, this condenser may be of such value as to produce a clear, readable image of the transmitted character. In practice it has been found that the condenser 209 is discharged slowly through the leakage of associated wiring so that in the lapse of time before a second key is depressed it is discharged and in condition to take part in the subsequent cycle. In order however to assure this result the usual practice has been followed in shunting the condenser with the high resistance 211. With present reproducing apparatus the image of each character must remain for one-half to one second for continuous reading by an operator, but less time is required if the image is photographed. In view of this small length of time, the characters may be transmitted by depression of the individual keys without regard to the time it requires for the desired number of revolutions of the master counter circuit. By the time an ordinary operator depresses a second key the letter or character formed by reason of the depression of a prior key will already be faded out since the master counter circuit will already have stopped. It is to be understood, of course, that in accordance with the construction of ordinary keyboards, means will be provided for preventing the depression of more than one key at a time.

Means for receiving the character-forming signals generated by the system illustrated in Figs. 1, 2 and 3 and for reproducing these signals as visual intelligence are illustrated in Fig. 5. Such a receiving system may include a broad band receiver 300 acting through an amplifier 322 directly upon the control grid 282 of a cathode ray tube 284. A horizontal sweep voltage may be derived from an oscillator 286 acting through a clipper 288 and a differentiator 290 upon a saw-tooth generator 292, while vertical sweep voltage may be derived from an oscillator 294 keyed to act in synchronism with the generator 292 and operating a second saw-tooth generator 323. A phaser 293 may be used to control the oscillator 286 so that the picture of the received character may be properly positioned upon the screen of the cathode ray tube. Synchronizing means other than the phaser 293 will not be required. The receiving system just described forms no specific part of the present invention and is disclosed in more detail in the copending application of E. M. Deloraine and the present applicant, S. N. 489,760, filed June 5, 1943.

It will also be obvious to those skilled in this art that the signals may be reproduced by means other than a cathode ray tube for example, upon a moving tape. In such cases each band of the letter would be controlled by an individual pencil or other marking device and instead of using a single gate tube common to all of the electronic counter circuits, each electronic counter circuit could operate its individual gate tube whose outputs would be separately transmitted to the receiver. Tape-reproducing devices of this character are known to the art and need not therefore be described in detail. A system for utilizing individual gate tubes corresponding to each band of the character to be formed is to be found in more detail in the aforesaid copending Deloraine-de Rosa application, and also the application of de Rosa alone, S. N. 491,287, filed June 18, 1943.

Certain details of construction which would be obvious to those skilled in this art have not been minutely described since they themselves are not considered to form any part of the invention. For example, means will be provided for releasing a depressed key of the keyboard, without pressing some other character-forming key. While I have illustrated in Figs. 2 and 3 the use of switch means for each key to start and stop the master counter circuit, it will be understood that such switch means may be in the form of a separately actuated key if desired. Furthermore, while I have illustrated as an example of this invention a keyboard in which the keys directly operate switches for interconnecting the outputs of the master counter circuit with the gate tube, it will be understood by those skilled in this art that individual keys may actuate relays for applying this directly instead of indirectly. The form of switch mechanism illustrated has only been given by way of example and it is not intended that this invention be limited to any particular type of key-operated switch mechanism.

No means have been illustrated for definitely synchronizing the receiver with the transmitter system. As previously stated, such synchronization is not necessary in most cases and the mere adjustment of the scanned voltage by a phaser, as described, to bring the picture of the character to the center of the screen is usually sufficient. However, if positive synchronization is desired, for example, in the case of a tape reproducer, this may be effected by the transmission and reception of an additional synchronizing pulse in any manner known to the art.

While I have shown and described one embodiment of my invention it is to be understood that it may be embodied in other forms without departing from the principles thereof and that this description is made only by way of example and not as a limitation on the scope of my invention as set forth in the objects and the accompanying claims.

I claim:

1. A pulse intelligence transmission system comprising character-identifying elements and means controlled thereby for establishing an electric pattern corresponding to a respective character, a means including an electric discharge device counter circuit operating during each cycle thereof to scan said pattern and derive thereby a series of sequential pulses peculiar to each character, means for separately transmitting said pulses of said series and means for enabling a predetermined repetition of the scanning of each character pattern.

2. A pulse intelligence transmission system comprising character-identifying elements and means controlled thereby for establishing an electric pattern corresponding to a respective character, means including an electric discharge device counter circuit operating during each cycle thereof to scan said pattern, means controlling the scanning device to derive sequentially pulses timed relatively to represent said character and means for separately transmitting the pulses of said series.

3. A pulse intelligence transmission system according to claim 2 including means enabling a predetermined repetition of the scanning of each character pattern.

4. A pulse intelligence transmission system according to claim 2 wherein the scanning means operates effectively to scan the circuit field in two directions.

5. An intelligence transmission system utilizing pulses so related that the configurations of characters transmitted by the pulses are represented by selections therefrom arranged in successive bands, the combination of a master electronic counter circuit comprising a plurality of sequentially firing gaseous discharge tubes, said master electronic counter circuit being divided into a plurality of serially connected sub-counter circuits corresponding to the number of bands for forming the characters, and each sub-counter circuit containing a number of gaseous discharge tubes corresponding to the assigned number of pulses for each band, means deriving pulses from each gaseous discharge tube, means for transmitting pulses, means for starting and stopping said master electronic counter circuit, and controllable switch means interconnecting said pulse-deriving means to said pulse transmitting means to apply sequentially timed pulses thereto in accordance with the shape of a desired character.

6. The combination according to claim 5, in which said switching means comprises a keyboard provided with a plurality of control keys each having indicia thereon corresponding to a character to be transmitted, and switches intermediate said pulse-deriving means and said transmitting means operated by said keys.

7. The combination according to claim 5, in which said switching means comprises a keyboard provided with a plurality of control keys each having indicia thereon corresponding to a character to be transmitted, and switches intermediate said pulse-deriving means, operated by said keys, and in which said starting means includes an additional switch actuated by each key connected to the grid circuit of the first tube of the first sub-counter circuit, and means controlled by said additional switches for momentarily increasing the grid potential of said first tube.

8. The combination according to claim 5, in combination with an additional gaseous discharge tube interconnecting the last tube of the last sub-counter circuit with the first tube of the first sub-counter circuit, whereby said master counter circuit will operate in a continuously rotating fashion and wherein said starting and stopping means includes a condenser and a ground, means connecting the grid of the first tube of the first sub-counter circuit to the ground for reducing the grid potential thereon and rendering said first tube conductive, and means for connecting the grid of the said first tube and the cathode of said additional tube to ground through said condenser to build up sufficient potential on said condenser after a number of cycles of operation of said master counter circuit to extinguish said additional tube without re-energizing the grid of said first tube, whereby said master counter circuit will cease to operate.

9. The combination according to claim 5, in combination with an additional gaseous discharge tube interconnecting the last tube of the last sub-counter circuit with the first tube of the first sub-counter circuit, whereby said counter circuit will operate in a continuously rotating fashion, in which said switching means comprises a keyboard provided with a plurality of control keys each having indicia thereon corresponding to a character to be transmitted, and switches intermediate said pulse-deriving means and said transmitting means operated by said keys, and in which said starting and stopping means includes a condenser, a ground, negative grid biasing means on said first tube of the first sub-counter circuit, an additional switch operated by each switch, and conductors interconnecting each of said additional switches to said grid, said condenser and the grid of said first tube and the cathode of said additional tube, so that when a key is depressed each key first, momentarily, connects the grid of said first tube to ground for removing the grid biasing means therefrom to start the master counter circuit operating, and then in the final depressed condition each switch connects the grid of the said first tube and the cathode of said additional tube through said condenser to prevent starting the first tube after a number of cycles of operation of the master counter circuit.

10. In a system for the transmission and reception of intelligence, the combination of a plurality of serially connected counter circuits with the last counter circuit connected back to the first counter circuit to form a rotating master counter circuit system, each of said counter circuits including a plurality of sequentially firing gaseous discharge tubes, means deriving a series of sequentially timed pulses from said serially connected counter circuits, a normally non-conductive gate tube, a high frequency energy source for said gate tube, an actuating circuit for the gate tube, means for starting and stopping said series of counter circuits, variable switching means intermediate said various pulse-deriving means and the actuating circuit of said gate tube to apply sequentially timed pulses thereto in accordance with the intelligence-signifying signals.

11. The combination according to claim 10, in which said switching means comprises a keyboard provided with a plurality of control keys each having indicia thereon corresponding to a character to be transmitted, and switches intermediate the pulse-deriving means and the actuating circuit of said gate tube, operated by said keys.

12. The combination according to claim 10, in which said switching means comprises a keyboard provided with a plurality of control keys each having indicia thereon corresponding to a character to be transmitted, and switches intermediate said pulse-deriving means and the actuating circuit of said gate tube operated by said keys, and in which said starting means includes an additional switch operated by each key connected to the grid circuit of the first tube of the first counter circuit and means controlled by said additional switches for momentarily increasing the grid potential of said first tube.

13. In a system for the transmission and reception of intelligence, the combination of a plurality of serially connected electronic counter circuits with the last counter circuit connected back to the first counter circuit to form a rotating master counter circuit system, each of said counter circuits including a plurality of sequentially firing gaseous discharge tubes, means deriving a series of sequentially timed pulses from said serially connected counter circuits, a normally non-conductive gate tube, a high frequency energy source for said gate tube, an actuating circuit for said gate tube, means for starting and stopping said master counter circuit and variable switching means intermediate said pulse deriving means and the actuating circuit of said gate tube to apply sequentially timed pulses thereto in accordance with the intelligence-signifying signals.

14. The combination according to claim 13, in which said switching means comprises a keyboard provided with a plurality of control keys each having indicia thereon corresponding to a character to be transmitted, and switches intermediate the pulse-deriving means and the actuating circuit of said gate tube, operated by said keys.

15. The combination according to claim 13, in which said switching means comprises a keyboard provided with a plurality of control keys each having indicia thereon corresponding to a character to be transmitted, and switches intermediate said pulse-deriving means and the actuating circuit of said gate tube operated by said keys, and in which said starting means includes an additional switch operated by each key connected to the grid circuit of the first tube of the first counter circuit, and means controlled by said additional switches for momentarily increasing the grid potential of said first tube.

16. The combination according to claim 13, in combination with an additional gaseous discharge tube interconnecting the last tube of the last electronic counter circuit with the first tube of the first electronic counter circuit, whereby said master counter circuit will operate in a continuously rotating fashion, and wherein said starting and stopping means includes a condenser, a ground connection, means providing a negative grid bias on the first tube of the first electronic counter circuit, means connecting the grid of the said tube to ground for reducing the grid bias thereon and rendering said first tube conductive, and means for connecting the grid of said first tube and the cathode of said additional tube through said condenser to build up sufficient potential on said condenser after a number of cycles of operation of the master counter circuit to prevent re-energizing the grid of said first tube, whereby said master counter circuit will cease to operate.

LOUIS A. DE ROSA.